United States Patent
Nguyen et al.

(10) Patent No.: US 6,356,581 B1
(45) Date of Patent: Mar. 12, 2002

(54) EFFICIENT METHOD OF PROVIDING SYMBOL DATA FROM DEMODULATOR TO A PROCESSOR

(75) Inventors: Tien Nguyen, San Diego; John McDonough, La Jolla; Juncheng C. Liu, San Diego, all of CA (US)

(73) Assignees: Philips Electronics North American Corporation, New York, NY (US); Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/321,681

(22) Filed: May 28, 1999

(51) Int. Cl.[7] .......................... H04B 15/00; H04K 1/00; H04L 27/30
(52) U.S. Cl. ....................................... 375/148; 375/349
(58) Field of Search .................. 375/148, 149; 370/320, 335, 342, 441

(56) References Cited

U.S. PATENT DOCUMENTS 5,764,687 A * 6/1998 Easton ........................ 375/206
6,128,329 A * 10/2000 Takakusaki ................. 375/140

* cited by examiner

*Primary Examiner*—Chi Pham
*Assistant Examiner*—Phuong Phu
(74) *Attorney, Agent, or Firm*—Wagner, Murabito & Hao LLP

(57) ABSTRACT

An apparatus and method thereof for sampling multipath signal data in a receiver. The apparatus includes a plurality of demodulators coupled in parallel, each of the plurality of demodulators receiving digital baseband signal data and demodulating the digital baseband signal data, a controller coupled to the plurality of demodulators, and a timer coupled to the controller. The timer generates a controller interrupt at a specified frequency. The controller interrupt causes the controller to sample demodulated signal data from the plurality of demodulators. The specified frequency is greater than the symbol rate.

22 Claims, 5 Drawing Sheets

EFFICIENT METHOD OF PROVIDING SYMBOL DATA FROM DEMODULATOR TO A PROCESSOR

TECHNICAL FIELD

The present invention pertains to the field of wireless communication technology. More specifically, the present invention pertains to demodulating and processing signals received by a receiver in a spread spectrum communication system.

BACKGROUND ART

Wireless telephony has become a widely available mode of communication in modern society. Variable rate communication systems, such as Code Division Multiple Access (CDMA) spread spectrum systems, are among the most commonly deployed wireless technology. Variable rate communication systems transmit data in units called data frames.

A CDMA system utilizes digital encoding for every telephone call or data transmission in order to provide privacy and security. Unique codes are assigned to every communication, which distinguish it from the multitude of calls simultaneously transmitted over the same broadcast spectrum. Users share time and frequency allocations and are channelized by unique assigned codes. The signals are separated at the receiver in a known manner so that the receiver accepts only signals from the desired channel.

One of the main advantages of a CDMA system is the capability to use signals that arrive at the receiver with different time delays, referred to as multipath. The different time delays are caused by, for example, the receiver location and the path taken by the transmitted signal (e.g., the signal might reflect off of a building). CDMA combines the multipath signals to create a stronger signal at the receiver.

In a typical implementation, a CDMA receiver (e.g., a rake receiver) uses multiple receivers or demodulators (referred to as fingers). Each finger demodulates the signal, and the results are combined to make a stronger signal.

Prior Art FIG. 1 illustrates an exemplary receiver 10 of the prior art. The transmitted signal is received by analog transceiver 12 using an antennae (not shown). Analog transceiver 12 digitizes the received signal and provides the results to digital transceiver 14. Each demodulator 15a, 15b, 15c and 15d (e.g., fingers) is assigned to demodulate the transmitted signal that traveled by a different path to receiver 10 (that is, a multipath signal). Digital transceiver 14 also includes processing hardware 16 for operations such as combining, deinterleaving, and decoding.

A disadvantage to the prior art is the use of hardware for operations such as combining, deinterleaving, and decoding. In particular, the use of hardware for these operations limits the flexibility available for implementing different approaches. For example, the hardware is likely designed for a particular approach, and thus may not be readily adaptable to different approaches. Hardware components can also be expensive to manufacture. Software, on the other hand, can provide greater flexibility and may also be less expensive than hardware. Thus, in some instances it is desirable to replace the hardware with software or a combination of hardware and software.

When software is introduced, the functions formerly performed with hardware will be performed with different techniques that can be used in software. One such hardware function is accounting for the time offsets associated with the different arrival times of multipath signals. The time delays are asynchronous. Hardware implementations (e.g., processing hardware 16) account for the time offsets using various techniques known in the art.

With software, the multipath signal is demodulated by each finger and the resulting data are stored in a buffer (other operations known in the art may also be performed). In each finger, the data are integrated until one symbol (equivalent to 64 chips) is stored. When one symbol is stored in a finger, that finger generates an interrupt that is sent to the processor (e.g., a digital signal processor, DSP). In response to the interrupt, the processor reads the stored symbol from that finger and processes the symbol data. At the same time, data from other fingers can also be read and processed.

For the purpose of reducing overall power consumption in the receiver, it is desirable to put the processor into "sleep" mode whenever possible. Otherwise, the processor continues to consume the full power it needs, reducing the time between battery charges or necessitating larger batteries. Consumers desire less expensive, lighter and convenient receivers, and so increasing the frequency of battery charges or the size of the battery is contrary to consumer preferences.

However, the prior art is problematic because of the different time offsets associated with a multipath signal. As a result of the offset, each finger will store a symbol at different times. Hence, interrupts are sent to the processor frequently. Frequent interrupts to the processor either do not provide the opportunity to place the processor into sleep mode, or reduce the amount of time that the processor is in sleep mode. For example, each time the processor is ready to enter its sleep mode, an interrupt is received and so the processor is constantly "awake" and at full power; or, just as the processor enters its sleep mode, it may be "awakened" by another interrupt and so is not powered down for an extended period. In some instances, additional power is needed to wake up the processor, and so frequent wakeups can also increase overall power consumption and reduce the time between battery charges.

Another disadvantage to the prior art is that frequent interrupts can disrupt or delay the other processing functions performed by the processor. That is, if the processor is servicing an interrupt, it may not be able to perform other processing that is needed. As a result, the other processing functions are delayed or slowed, reducing the overall performance of the receiver.

Accordingly, what is needed is an apparatus that can be used with software and that can efficiently account for the asynchronous time offsets associated with multipath signals. What is also needed is an apparatus that addresses the above needs and reduces the number of processor interrupts, reduces processor power consumption, and improves processing performance. The present invention provides a novel solution to the above needs.

These and other objects and advantages of the present invention will become obvious to those of ordinary skill in the art after having read the following detailed description of the preferred embodiments which are illustrated in the various drawing figures.

DISCLOSURE OF THE INVENTION

The present invention provides an apparatus and method thereof that can be used with software and that can efficiently account for the asynchronous time offsets associated with multipath signals. The present invention also provides an apparatus and method thereof that address the above needs, reduce the number of processor interrupts, reduce processor power consumption, and improve processor performance.

The present embodiment of the present invention pertains to an apparatus and method thereof for sampling multipath signal data. In a preferred embodiment, the apparatus is disposed within a receiver used in a communication system, in particular a communication system that uses code division multiple access (CDMA) spread spectrum type communication signals (e.g., multipath signals).

In the present embodiment, the apparatus includes a plurality of demodulators, each of the plurality of demodulators receiving signal data and demodulating the signal data, a controller coupled to the plurality of demodulators, and a timer coupled to the controller. The timer generates a controller interrupt at a specified frequency. The controller interrupt causes the controller to sample demodulated signal data from the plurality of demodulators. In one embodiment, the specified frequency is greater than the symbol rate. In another embodiment, the specified frequency is equal to the symbol rate.

In one embodiment, each demodulator includes a buffer, and the demodulated signal data are stored in the buffer. The demodulated signal data stored in the buffer subsequent to a controller interrupt can be distinguished from the demodulated signal data stored in the buffer prior to the controller interrupt (for example, by using a status bit).

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
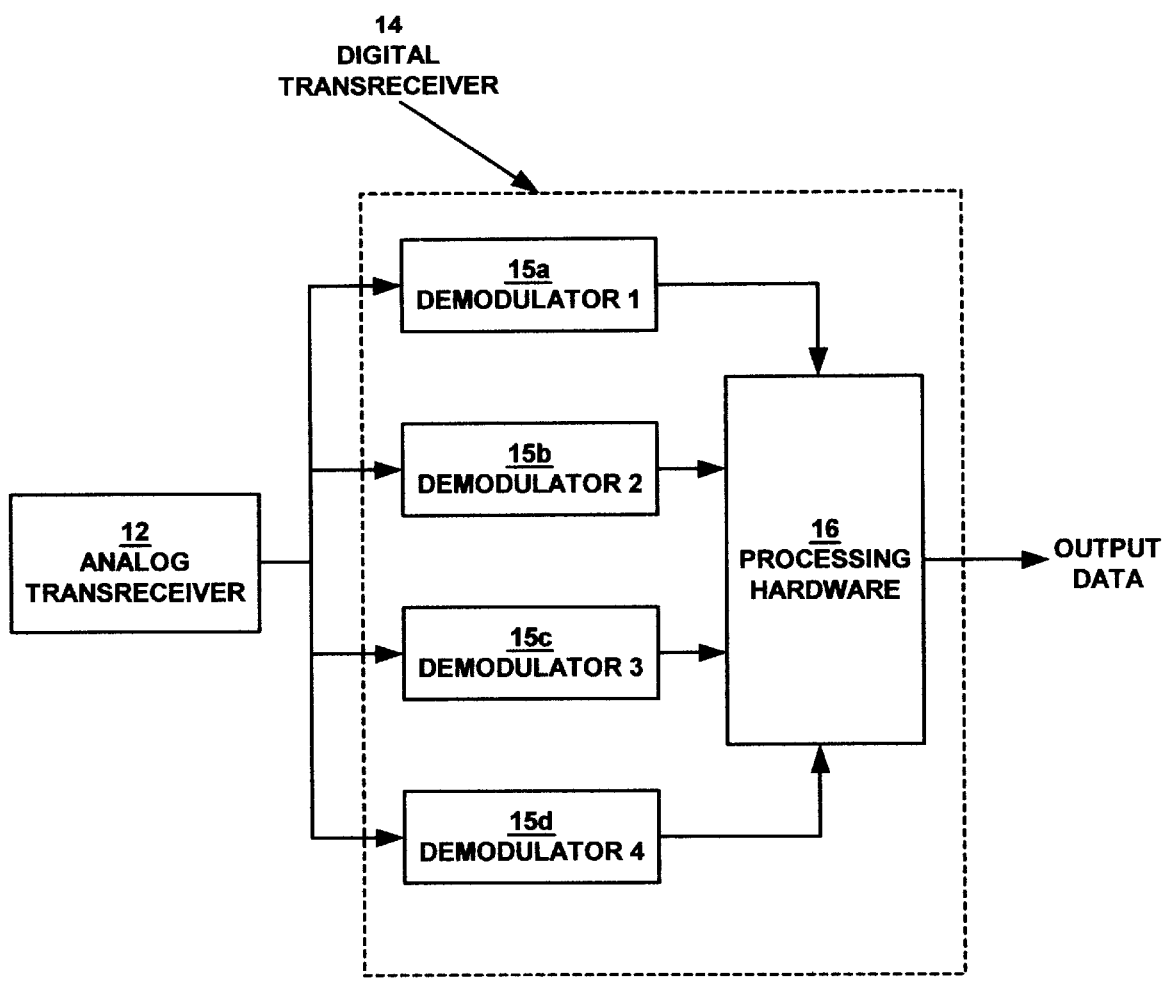
FIG. 1 is a block diagram of a prior art receiver.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

As used herein, a transaction refers to the transmission or receipt of data or other such message information. The transaction may consist of all data associated with a particular computer system operation (e.g., a request or command). A transaction may also consist of a block of data associated with a particular operation; for example, a transfer of data may be broken down into several blocks of data, each block transferred prior to the transfer of a subsequent block, and each block making up a transaction.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "demodulating," "generating," "sampling," "storing" or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

The present invention is discussed in the context of a wireless communication system, in particular a system that uses code division multiple access (CDMA) spread spectrum type communication signals. In a preferred embodiment, the present invention is implemented in a receiver used in a wireless communication system. However, it is understood that other applications and implementations may be used in accordance with the present invention.

Figure 2:
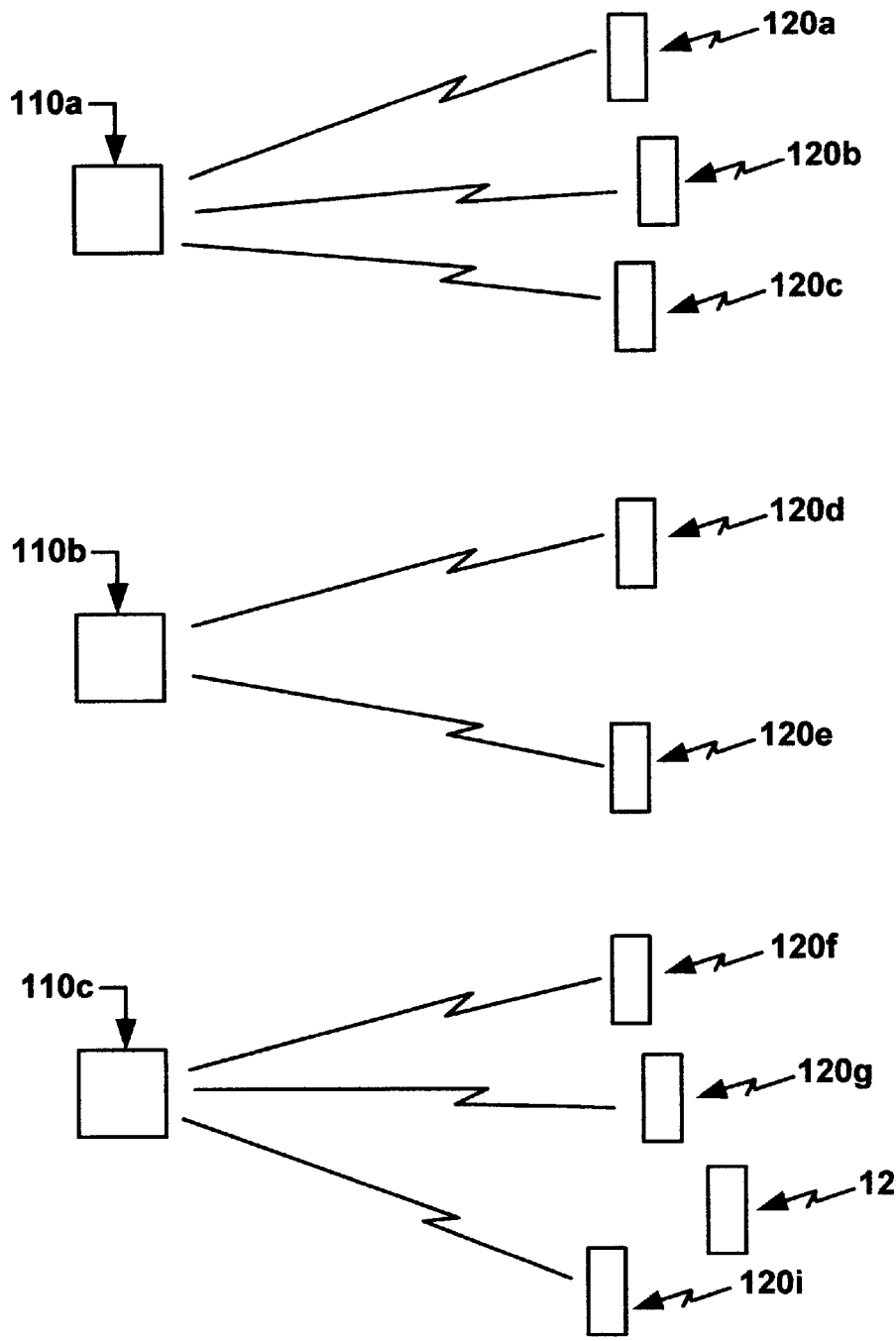
FIG. 2 provides a general overview of a wireless communication system in accordance with one embodiment of the present invention.

FIG. 2 provides a general overview of a wireless communication system 100 in accordance with one embodiment of the present invention. Communication system 100 consists of a family of base stations 110a, 110b and 110c (e.g., cells) that are geographically distributed over the service area. Communication system 100 also includes a plurality of subscriber stations (e.g., receivers 120a–120i). Communication system can be coupled to a standard telephone wire system (not shown). In the present embodiment, communication system 100 uses CDMA spread spectrum type communication signals (e.g., multipath signals), although it is appreciated that other applications using different communication technologies can be used in accordance with the present invention.

Each of receivers 120a–120i is exemplified as a mobile station such as personal cordless telephone, a pager, or a computer system with a wireless modem; however, a subscriber station may also be in a relatively fixed location, such as a standard computer system with a wireless modem or the like.

Communication is established between a base station (e.g., base station 110*a*) and a subscriber station (e.g., receiver 120*a*) using well-known techniques. Communication can occur using multipath signals from base station 110*a* to receiver 120*a*. Once communication is established, movement of receiver 120*a* is detected and service is handed over from one base station to another.

Figure 3:
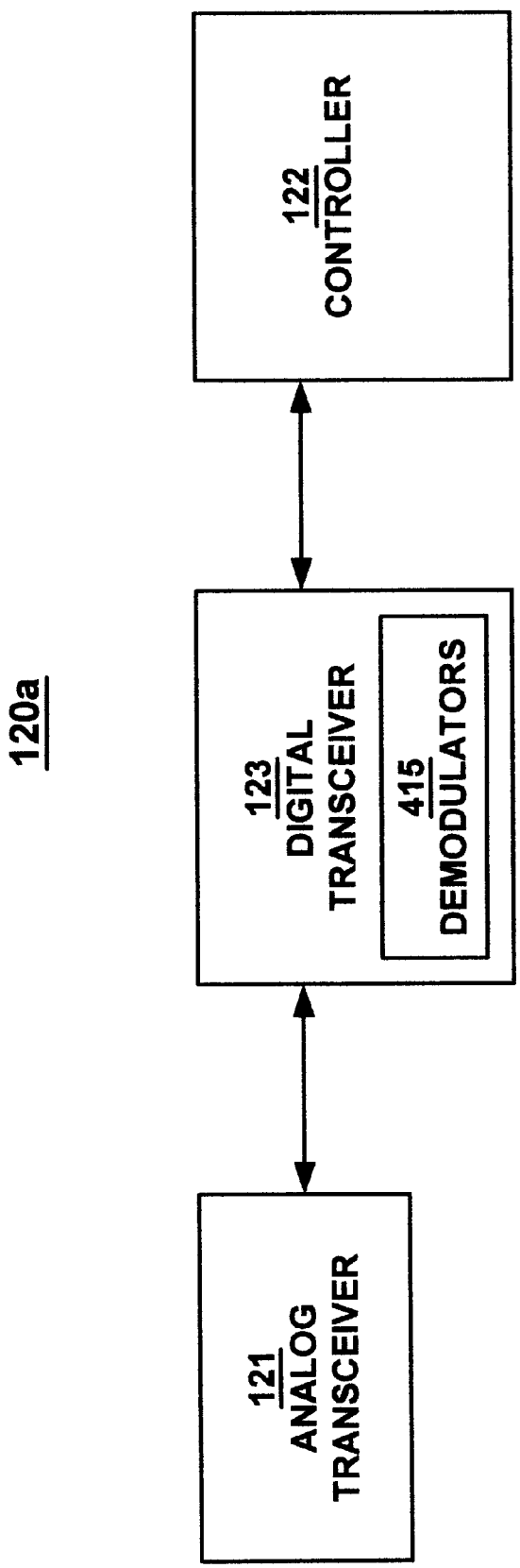
FIG. 3 illustrates the primary functional blocks in an exemplary receiver in a wireless communication system in accordance with one embodiment of the present invention.

FIG. 3 illustrates the primary functional blocks in a subscriber station exemplified by receiver 120*a* in accordance with one embodiment of the present invention. Analog transceiver 121 is used, for example, to receive the communication signal from base station 110*a* (FIG. 1) and convert it from an analog signal to a digital baseband signal. Controller 122 consists of, for example, the central processing unit, a digital signal processor (if present), hardware control and associated software, and executes the control logic for receiver 120*a*. Digital transceiver 123 contains the digital data processing elements such as demodulators 415. It is appreciated that FIG. 3 illustrates the functional blocks, and that the components in receiver 120*a* may be implemented in different configurations in accordance with the present invention.

Figure 4:
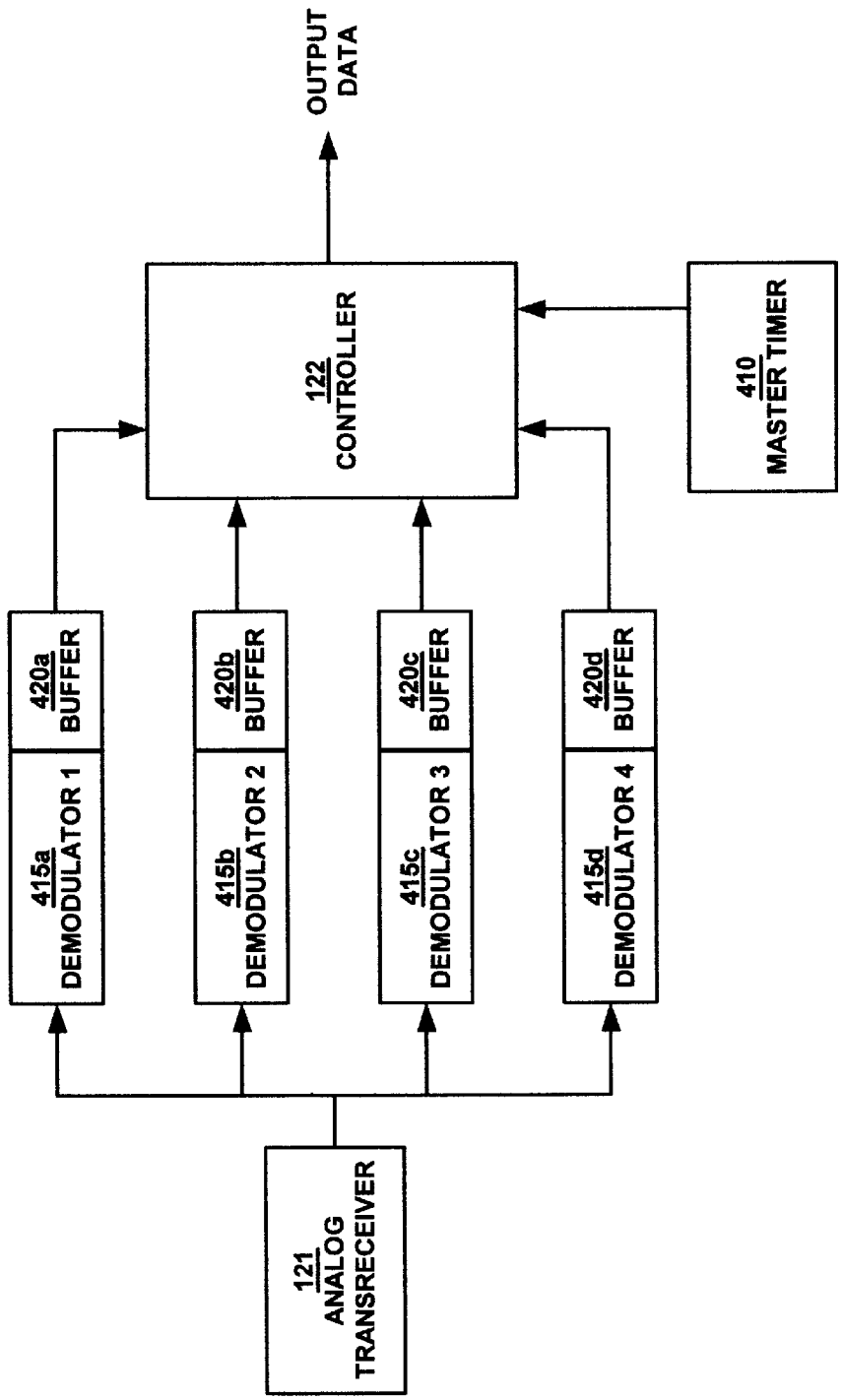
FIG. 4 is a block diagram of the receiver of FIG. 3 in accordance with one embodiment of the present invention.

FIG. 4 is a block diagram illustrating portions of receiver 120*a* in accordance with one embodiment of the present invention. In this embodiment, there are four demodulators 1–4 (demodulators 415*a*, 415*b*, 415*c* and 415*d*, respectively), although it is appreciated that the present invention can be implemented with more or less demodulators. In the present embodiment, a multipath signal is selected by a searcher demodulator (e.g., demodulator 415*a*) in combination with controller 122 (FIG. 3). Each propagation of the multipath signal is processed by a different one of demodulators 415*b*–415*d*. The processing performed by each demodulator includes, for example, QPSK (quadrature phase shift keyed) despread, Walsh uncover, integrate and dump, dot product, and the like using various techniques. As the processing is performed, in the present embodiment, the result from each of demodulators 415*a*–415*d* is stored in buffers 420*a*–420*d*, respectively. Demodulators 415*a*–415*d* and buffers 420*a*–420*d* are each controlled by controller 122, and controller 122 can access buffers 420*a*–420*d* to read data stored therein.

In the present embodiment, buffers 420*a*–420*d* comprise multiple locations for holding data. Data are processed and stored in buffers 420*a*–420*d* at a rate corresponding to the symbol rate. In the present embodiment, the symbol rate is 19,200 chips per second (cps) (19.2 Khz) corresponding to a chip rate of 1,228,800 (cps 1.2288 Mhz), where a symbol is equal to 64 chips. However, it is appreciated that different symbol rates and chip rates (either faster or slower) can be used in accordance with the present invention. Such symbol rates include: 9.6 Khz, 4.8 Khz, 38.4 Khz, 76.8 Khz, 153.6 Khz, 307.2 Khz, and 614.4 Khz.

With reference still to FIG. 4, master timer 410 is coupled to controller 122 in accordance with the present embodiment of the present invention. Master timer 410 generates a controller interrupt at a specified frequency. In response to the interrupt, controller 122 samples (reads) data each of buffers 420*a*–420*d*. In those instances in which controller 122 is in "sleep" mode (e.g., a reduced power mode for conserving power), the interrupt serves to "awaken" (e.g., power up) controller 122 so that it can perform the data read transaction as well as subsequent data processing operations.

In one embodiment, master timer 410 receives a Global Positioning System (GPS) time reference.

In accordance with the present invention, master timer 410 generates the controller interrupt at a frequency greater than or equal to the symbol rate. In a preferred embodiment, the controller interrupt is slightly above the symbol rate. Accordingly, in accordance with the present invention, interrupts are not generated by demodulators 415*a*–415*d* (previously, interrupts are generated by a demodulator each time a symbol is generated). Before an interrupt can be generated by a demodulator, a controller interrupt is generated for all demodulators by master timer 410.

The frequency of the controller interrupts generated by master timer 410 is established considering the time tracking performed in each demodulator. Currently, time tracking in each demodulator is at the sub-chip level. Accordingly, the controller interrupt frequency is set to account for time tracking in the demodulators. It is appreciated that if time tracking is done within a different tolerance, the controller interrupt frequency can be set accordingly.

Thus, master timer 410 functions to generate a concurrent controller interrupt for each demodulator. As a result, frequent controller interrupts occurring after different time intervals are eliminated in accordance with the present invention. By generating a controller interrupt at a frequency slightly faster than or equal to the symbol rate, the interval between interrupts is maximized and the number of interrupts is minimized, thereby reducing the amount of power consumed by controller 122. Thus, the time offsets between the various propagations of a multipath signal are accounted for in accordance with the present invention.

In the present embodiment, the demodulated signal data stored in buffers 420*a*–420*d* after a most recent controller interrupt are distinguished from the data stored in buffers 420*a*–420*d* prior to the most recent controller interrupt. In one implementation, a status register bit is used to indicate data generated after the most recent controller interrupt and the corresponding read transaction. Thus, when controller 122 performs a read transaction associated with its current interrupt, it is able to distinguish new data (data not yet read) from old data (data read previously as a result of a prior interrupt), and so controller 122 will read only the new data. Thus, in accordance with the present invention, data are efficiently exchanged from demodulators 415*a*–415*d* to controller 122, and the time at which controller 122 is powered on is consequently reduced.

Figure 5:
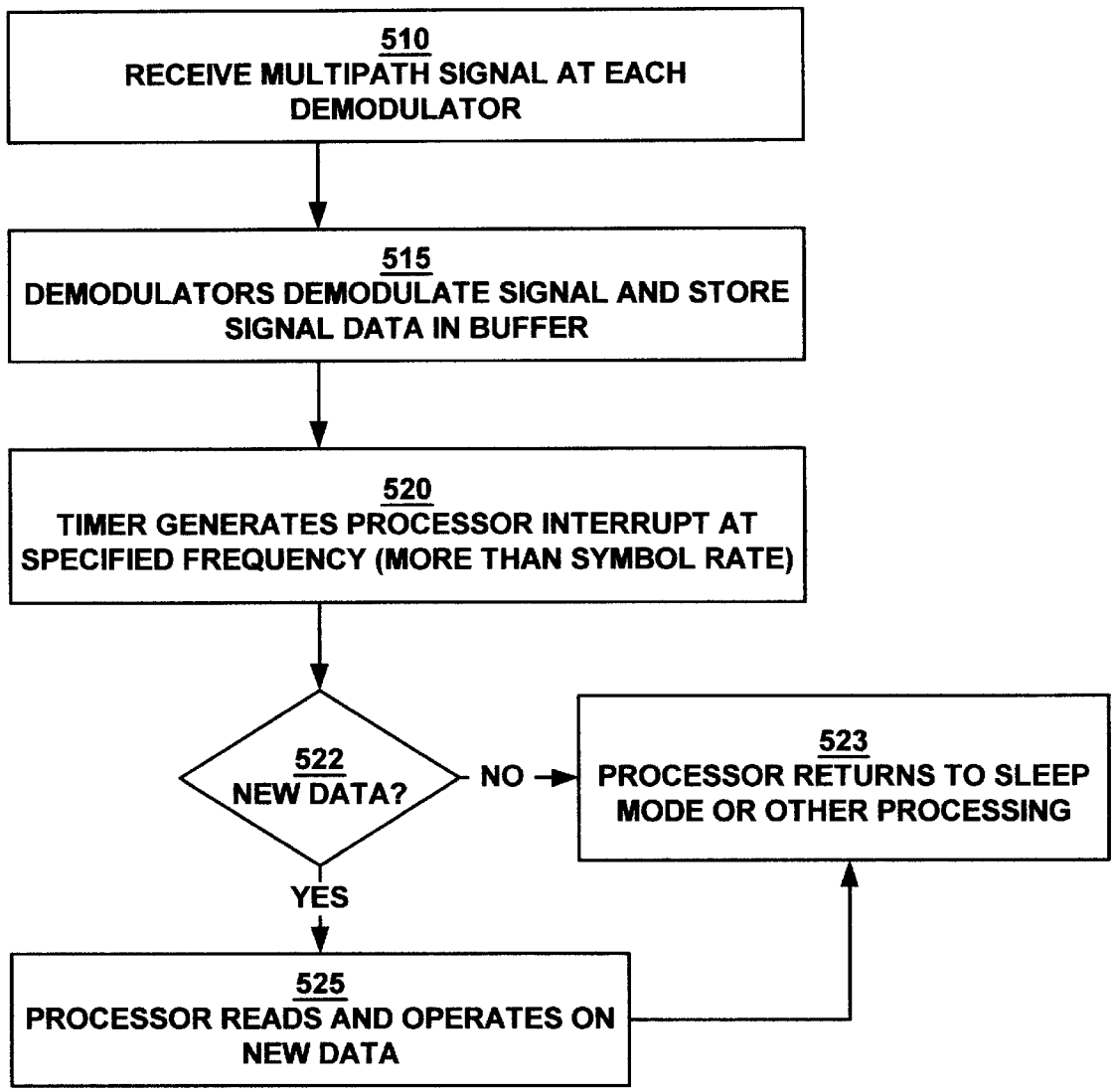
FIG. 5 is a flowchart of a process for sampling multipath signal data in accordance with one embodiment of the present invention.

FIG. 5 is a flowchart of process 500 implemented by controller 122 and digital transceiver 123 (FIG. 3) in accordance with one embodiment of the present invention.

In step 510 of FIG. 5, a multipath signal is selected by a searcher demodulator (e.g., demodulator 415*a* of FIG. 4) in combination with controller 122. The multipath signal is received by analog transceiver 121 (FIG. 3) and forwarded to demodulators 415*a*–415*d* of FIG. 4.

In step 515 of FIG. 5, each propagation of the multipath signal is processed by a different one of demodulators 415*a*–415*d*. For example, the processing includes QPSK despread and Walsh uncover, among other operations. The results of the processing are stored in buffers 420*a*–420*d* (FIG. 4). Processing is performed at a certain symbol rate; in the present embodiment, the symbol rate is 19.2 Khz.

In step 520 of FIG. 5, master timer 410 generates (e.g., posts) a controller interrupt, initiating a read transaction using controller 122 (FIG. 4). In accordance with the present invention, controller 122 is likely to be either in its sleep mode or processing other functions; consequently, the interrupt causes controller 122 to power up if necessary.

In one embodiment, the controller interrupt generated by master timer 410 occurs at a specified frequency that is higher than the symbol rate (that is, the controller interrupt occurs more frequently than a symbol is generated). In another embodiment, the controller interrupt occurs at a frequency equal to the symbol rate. Accordingly, controller interrupts are initiated by master timer 410 and not by a demodulator. In one embodiment, the frequency of controller interrupts is slightly greater than the symbol rate, thereby minimizing the number of interrupts and maximizing the interval between interrupts, so that the power consumed by controller 122 is reduced.

In step 522, new data stored in buffers 420a–420d (that is, data stored after the most recent interrupt) is distinguished from older data (that is, data stored before the most recent interrupt). In one embodiment, a status register bit is used to indicate new data versus older data. Thus, controller 122 is able to distinguish between data that have already been read during a previous read transaction associated with a prior interrupt, and data that have not been read.

In step 523, if there is no new (unread) data, then a read transaction is not performed and controller 122 returns to its sleep (powered down) mode or to performing other processing functions. Thus, the amount of time in which controller 122 is required to service interrupts is reduced, and so overall processing performance is improved.

In step 525, if there is new (unread) data, then controller 122 reads the new data and then can perform subsequent processing operations such as combining. Thus, in accordance with the present invention, data are efficiently exchanged from demodulators 420a–420d. In addition, subsequent processing is only required for the new data from the demodulators. Thus, the amount of time at which controller 122 is powered on is reduced, and power consumption is also reduced. In addition, the amount of time which controller 122 is servicing interrupts is reduced, and therefore overall processing performance is improved.

The present invention thus provides an apparatus and method thereof that can be used with software and that can efficiently account for the asynchronous time offsets associated with multipath signals. The present invention also provides an apparatus and method thereof that reduce the number of controller interrupts, reduce controller power consumption, and increase processing performance.

The preferred embodiment of the present invention, efficient method of providing symbol data from demodulator to a processor, is thus described. While the present invention has been described in particular embodiments, it should be appreciated that the present invention should not be construed as limited by such embodiments, but rather construed according to the following claims.

What is claimed is:

1. In a receiver, an apparatus for sampling multipath signal data, said apparatus comprising:

a plurality of demodulators, each of said demodulators receiving digital baseband signal data and demodulating said digital baseband signal data;

a controller coupled to said plurality of demodulators; and a timer coupled to said demodulators via said controller, said timer for generating a concurrent controller interrupt for each of said demodulators, said controller interrupt generated at a specified frequency, wherein said controller interrupt generated by said timer causes said controller to sample demodulated digital signal data from each of said demodulators at substantially the same time.

2. The apparatus of claim 1 wherein said specified frequency is greater than a symbol rate.

3. The apparatus of claim 2 wherein said symbol rate is 19.2 Khz.

4. The apparatus of claim 2 wherein said symbol rate is selected from the group consisting of 9.6 Khz, 4.8 Khz, 38.4 Khz, 76.8 Khz, 153.6 Khz, 307.2 Khz, and 614.4 Khz.

5. The apparatus of claim 1 wherein said specified frequency is equal to said symbol rate.

6. The apparatus of claim 1 wherein each demodulator further comprises:

a buffer for storing said demodulated signal data.

7. The apparatus of claim 6 wherein demodulated signal data stored in said buffer subsequent to a controller interrupt can be distinguished by said controller from demodulated signal data stored in said buffer prior to said controller interrupt.

8. The apparatus of claim 1 wherein said receiver is used in a wireless communication system.

9. The apparatus of claim 8 wherein said wireless communication system uses code division multiple access (CDMA) spread spectrum type communication signals.

10. In a receiver, a method for sampling multipath signal data, said method comprising the steps of:

a) receiving digital baseband signal data at a plurality of demodulators;

b) demodulating said digital baseband signal data using said plurality of demodulators;

c) generating a concurrent controller interrupt for each of said demodulators at a specified frequency using a timer coupled to said demodulators; and d) sampling demodulated digital signal data from each of said demodulators in response to said controller interrupt generated by said timer, wherein said sampling is performed at substantially the same time for each of said demodulators.

11. The method for sampling multipath signal data as recited in claim 10 wherein said specified frequency is greater than a symbol rate.

12. The method for sampling multipath signal data as recited in claim 11 wherein said symbol rate is 19.2 Khz.

13. The method for sampling multipath signal data as recited in claim 11 wherein said symbol rate is selected from the group consisting of 9.6 Khz, 4.8 Khz, 38.4 Khz, 76.8 Khz, 153.6 Khz, 307.2 Khz, and 614.4 Khz.

14. The method for sampling multipath signal data as recited in claim 10 wherein said specified frequency is equal to said symbol rate.

15. The method for sampling multipath signal data as recited in claim 10 wherein said step b) further comprises the steps of:

storing said demodulated signal data in a buffer; and distinguishing demodulated signal data stored subsequent to said controller interrupt from demodulated signal data stored prior to said controller interrupt.

16. The method for sampling multipath signal data as recited in claim 10 wherein said receiver is used in a wireless communication system.

17. The method for sampling multipath signal data as recited in claim 16 wherein said wireless communication system uses code division multiple access (CDMA) spread spectrum type communication signals.

18. In a receiver, an apparatus for sampling multipath signal data, said apparatus comprising:

a plurality of demodulators, each of said demodulators receiving digital baseband signal data and demodulating said digital baseband signal data;

each demodulator further comprising a buffer for storing demodulated signal data;

a controller coupled to said plurality of demodulators; and a timer coupled to said demodulators via said controller, said timer for generating a concurrent controller interrupt for each of said demodulators, said controller interrupt generated at a specified frequency greater than a symbol rate and wherein said controller interrupt generated by said timer causes said controller to sample demodulated digital signal data from said buffer of each said demodulator at substantially the same time.

19. The apparatus of claim 18 wherein said symbol rate is 19.2 Khz, wherein a symbol comprises 64 chips and a chip rate is 1.2288 Mhz.

20. The apparatus of claim 18 wherein said symbol rate is selected from the group consisting of 9.6 Khz, 4.8 Khz, 38.4 Khz, 76.8 Khz, 153.6 Khz, 307.2 Khz, and 614.4 Khz.

21. The apparatus of claim 18 wherein demodulated signal data stored in said buffer subsequent to a controller interrupt can be distinguished by said controller from demodulated signal data stored in said buffer prior to said controller interrupt.

22. The apparatus of claim 18 wherein said receiver is used in a wireless communication system that uses code division multiple access (CDMA) spread spectrum type communication signals.

* * * * *